United States Patent
Ekelund et al.

(10) Patent No.: US 12,056,570 B2
(45) Date of Patent: Aug. 6, 2024

(54) SYSTEM FOR GENERATING A LINKAGE BETWEEN USERS ASSOCIATED WITH A VEHICLE

(71) Applicants: Ningbo Geely Automobile Research & Development Co., Ltd., Ningbo (CN); Zhejiang Geely Holding Group Co., Ltd., Zhejiang (CN)

(72) Inventors: Johan Ekelund, Gothenburg (SE); Farshid Shafiabady, Gothenburg (SE)

(73) Assignees: Ningbo Geely Automobile Research & Dev. Co., Ltd., Ningbo (CN); ZHEJIANG GEELY HOLDING GROUP CO., LTD., Zhejiang (CN)

( * ) Notice: Subject to any disclaimer, the term of this patent is extended or adjusted under 35 U.S.C. 154(b) by 0 days.

(21) Appl. No.: 18/195,195

(22) Filed: May 9, 2023

(65) Prior Publication Data
US 2023/0274113 A1 Aug. 31, 2023

Related U.S. Application Data

(63) Continuation of application No. PCT/CN2021/130410, filed on Nov. 12, 2021.

(30) Foreign Application Priority Data

Nov. 16, 2020 (EP) ..................................... 20207833

(51) Int. Cl.
*G06K 7/14* (2006.01)
*H04W 76/10* (2018.01)

(52) U.S. Cl.
CPC .......... *G06K 7/1417* (2013.01); *H04W 76/10* (2018.02)

(58) Field of Classification Search
CPC ............................ G06K 7/1417; H04W 76/10
(Continued)

(56) References Cited

U.S. PATENT DOCUMENTS 10,317,897 B1   6/2019   Kentley-Klay
10,938,829 B2 *  3/2021   Shimizu ................ H04W 12/06
(Continued)

FOREIGN PATENT DOCUMENTS

CN   105578400 A   5/2016
CN   207704460 U   8/2018
(Continued)

OTHER PUBLICATIONS

International Search Report from corresponding International Application No. PCT/CN2021/130410, mailed on Jan. 25, 2022, 2 pages.

*Primary Examiner* — Daniel A Hess
(74) *Attorney, Agent, or Firm* — Tucker Ellis LLP (57) ABSTRACT

A system for generating a linkage between a vehicle and a user and for generating a linkage between users includes: a display device to display image data of a code; a communication device to communicate with a portable electronic device; a processing circuitry operatively connected to the display device and the communication device and configured to generate a unique code to be displayed, display the unique code at the display device to be read by a portable electronic device associated with a user, receive a determination that the unique code has been read by the portable electronic device associated with the user, and establish a trusted linkage between the vehicle and the user based on the presence of the portable electronic device at the vehicle.

9 Claims, 4 Drawing Sheets (58) Field of Classification Search
USPC .......................................................... 235/382
See application file for complete search history.

(56) References Cited

U.S. PATENT DOCUMENTS

| | | |
|---|---|---|
| 2010/0241857 A1 | 9/2010 | Okude |
| 2014/0187149 A1 | 7/2014 | Lortz |
| 2015/0210287 A1 | 7/2015 | Penilla |
| 2016/0147990 A1 | 5/2016 | Schneider |
| 2018/0218470 A1 | 8/2018 | Belwafa |
| 2020/0062076 A1 | 2/2020 | Elson |

FOREIGN PATENT DOCUMENTS

| | | |
|---|---|---|
| CN | 108876366 A | 11/2018 |
| CN | 109720354 A | 5/2019 |
| EP | 2211499 A1 | 7/2010 |
| WO | 2017178242 A1 | 10/2017 |

\* cited by examiner

SYSTEM FOR GENERATING A LINKAGE BETWEEN USERS ASSOCIATED WITH A VEHICLE

RELATED APPLICATION DATA

This application is a continuation of International Patent Application No. PCT/CN2021/130410, filed Nov. 12, 2021, which claims the benefit of European Patent Application No. 20207833.3, filed Nov. 16, 2020, the disclosures of which are incorporated herein by reference in their entireties.

TECHNICAL FIELD

The present disclosure relates to a system for generating a linkage between a vehicle and a user based on the presence of the user at the vehicle.

BACKGROUND

Today some vehicles enable portable electronic devices to connect to the vehicle. One problem is to establish a secure connection to a portable electronic device in a trusted way. There is a desire to know, in a trusted way, that a certain portable electronic device is at the vehicle, in order to determine e.g. when the certain portable electronic device is present at the vehicle. There is a desire to be able to associate presence of plural portable electronic devices at a vehicle, each portable electronic device associated with a user, in order to generate a social link between users associated with the vehicle.

SUMMARY

It is an object of the present disclosure to mitigate, alleviate or eliminate one or more of the above-identified deficiencies and disadvantages in the prior art and solve at least the above mentioned problem.

According to a first aspect there is provided a system for generating a linkage between a vehicle and a user and for generating a linkage between users linked to the vehicle. The system comprises a display device arranged at the vehicle configured to display image data of a code, a communication device configured to communicate with a portable electronic device, a processing circuitry configured to be operatively connected to the display device and the communication device.

The processing circuitry is configured to generate a unique code to be displayed at the display device, and display the unique code at the display device to be read by a portable electronic device associated with a user, and receive, via the communications device, a determination that the unique code has been read by the portable electronic device associated with the user, and establish a trusted linkage between the vehicle and the user based on the presence of the portable electronic device at the vehicle.

One advantage with this first aspect is that the unique code displayed at the display device can only be read by a portable electronic device that is present in front of the display device when the unique code is generated and displayed, i.e. at the vehicle, and the trusted linkage can be generated accordingly.

According to some embodiments, the processing circuitry is further configured to generate linkage data indicative of a linkage between the vehicle and the user associated with the portable electronic device.

One advantage with this embodiment is that an existing secure association between the user and the portable electronic device can be used to further associate the user with the vehicle.

According to some embodiments, the processing circuitry is further configured to obtain predetermined social data associated with the user.

According to some embodiments, the processing circuitry is further configured to receive, via the communications device, a determination that a first unique code has been read by a first portable electronic device associated with a first user, and receive, via the communications device, a determination that a second unique code has been read by a second portable electronic device associated with a second user, and establish a trusted linkage between the vehicle, the first user and the second user based on the presence of the first portable electronic device and the second portable electronic device at the vehicle.

According to some embodiments, the processing circuitry is further configured to obtain, based on the trusted linkage between the vehicle, the first user and the second user, predetermined social data of the first user and predetermined social data of the second user, and determine correlation data between the obtained predetermined social data of the first user and the obtained predetermined social data of the second user, and generate social association linkage data between the first user and the second user in a determination that the correlation data is above a predefined threshold level.

According to some embodiments, the processing circuitry is further configured to allow control of a vehicle application associated with the vehicle, by the portable electronic device, based on the trusted linkage, and receive control data, indicative of instructions for controlling the vehicle application, from the portable electronic device via a wireless communication network, and control the vehicle application.

One advantage with this embodiment is that a user can be allowed to control a vehicle application via the portable electronic device in a trusted way.

According to some embodiments, the processing circuitry is further configured to time stamp the unique code and store time stamp data associated with the generated unique code, and store linkage data comprising the time stamp data associated with the generated unique code and user data of the user associated with the portable electronic device.

One advantage with this embodiment is that linkage data can be used for determining when in time a generated unique code is read by the portable electronic device and e.g. determine usage by the user of the vehicle and/or the vehicle application associated with a time.

According to some embodiments, the processing circuitry is further configured to notify at least any of the first user and the second user, via a user interface of at least any of the first portable electronic device and the second portable electronic device, a notification message indicative of the social association linkage data between the first user and the second user.

According to some embodiments, the notification message indicative of the social association linkage data between the first user and the second user is an indication that the first user and the second user are currently travelling with the vehicle or an indication of a mutual time span when the first user and the second user usually are travelling with the vehicle.

According to some embodiments, the notification message indicative of the social association linkage data between the first user and the second user further indicates a recommended time when the first user and the second user are recommended to travel with the vehicle in order to travel together with the vehicle.

According to some embodiments, the unique code is dynamically generated based on a triggering event, wherein the triggering event is any of starting the vehicle, opening or closing of a vehicle door, detection of an input of a user interface, detection of a wireless communication of a portable electronic device.

One advantage with this embodiment is that the triggering event can be used for controlling the generation of the unique code in order to have a unique code to be read by the portable electronic device e.g. when the user starts using or ends using the vehicle and/or the vehicle application.

According to some embodiments, the unique code is dynamically generated continuously at a predefined time interval until a determination of that the unique code has been read by a portable electronic device associated with a user.

One advantage with this embodiment is that the portable electronic device always reads a unique code that is never older than a predefined time interval which can be set dependent on a desired security level.

According to some embodiments, the processing circuitry is further configured to determine usage data based on the linkage data indicative of the use of the vehicle by the user, and generate payment details based on the usage data.

One advantage with this embodiment is that time information, and e.g. usage of vehicle application etc., can be determined and form base for payment details to be used for charging the user of certain usage of the vehicle.

According to some embodiments the unique code is configured to be read by a portable electronic device comprising a reader device that is any of a camera reader, a video camera reader, a pen-type reader with photodiodes, a laser scanner reader, a charge-coupled device reader.

One advantage with this embodiment is that the unique code can be read by a plural of different reader devices.

According to a second aspect there is provided a method for generating a linkage between a vehicle and a user and for generating a linkage between users linked to the vehicle. The method the vehicle comprises the step of generating a unique code to be displayed at a display device arranged at the vehicle, the step of displaying the unique code at the display device to be read by a portable electronic device associated with a user, the step of receiving, via a communications device, a determination that the unique code has been read by the portable electronic device associated with the user, and the step of establishing a trusted linkage between the vehicle and the user based on the presence of the portable electronic device at the vehicle.

One advantage with this second aspect is that the unique code displayed at the display device can only be read by a portable electronic device that is present in front of the display device when the unique code is generated and displayed, i.e. at the vehicle, and the trusted linkage can be generated accordingly.

According to some embodiments the method further comprising generating linkage data indicative of a linkage between the vehicle and the user associated with the portable electronic device.

One advantage with this embodiment is that an existing secure association between the user and the portable electronic device can be used to further associate the user with the vehicle.

According to some embodiments the method further comprising obtaining predetermined social data associated with the user.

According to some embodiments the method further comprising the step of receiving, via the communications device, a determination that a first unique code has been read by a first portable electronic device associated with a first user, and the step of receiving, via the communications device, a determination that a second unique code has been read by a second portable electronic device associated with a second user, and the step of establishing a trusted linkage between the vehicle, the first user and the second user based on the presence of the first portable electronic device and the second portable electronic device at the vehicle.

According to some embodiments the method further comprising the step of obtaining, based on the trusted linkage between the vehicle, the first user and the second user, predetermined social data of the first user and predetermined social data of the second user, and the step of determining correlation data between the obtained predetermined social data of the first user and the obtained predetermined social data of the second user, and the step of generating social association linkage data between the first user and the second user in a determination that the correlation data is above a predefined threshold level.

According to some embodiments the method further comprising notifying at least any of the first user and the second user, via a user interface of at least any of the first portable electronic device and the second portable electronic device the, a notification message indicative of the social association linkage data between the first user and the second user.

According to some embodiments the notification message indicative of the social association linkage data between the first user and the second user is an indication that the first user and the second user are currently travelling with the vehicle or an indication of a mutual time span when the first user and the second user usually are travelling with the vehicle.

According to some embodiments the method further comprising allowing control of a vehicle application associated with the vehicle, by the portable electronic device, based on the trusted linkage, and receiving control data, indicative of instructions for controlling the vehicle application, from the portable electronic device via a wireless communication network, and control the vehicle application.

One advantage with this embodiment is that a user can be allowed to control a vehicle application via the portable electronic device in a trusted way.

According to some embodiments the method further comprising time stamping the unique code and storing time stamp data associated with the generated unique code, and storing linkage data comprising the time stamp data associated with the generated unique code and user data of the user associated with the portable electronic device.

One advantage with this embodiment is that linkage data can be used for determining when in time a generated unique code is read by the portable electronic device and e.g. determine usage by the user of the vehicle and/or the vehicle application associated with a time.

According to some embodiments the method further comprising determining usage data, based on the linkage data, indicative of the use of the vehicle by the user, and generating payment details based on the usage data.

One advantage with this embodiment is that time information, and e.g. usage of vehicle application etc., can be determined and form base for payment details to be used for charging the user of certain usage of the vehicle.

According to some embodiments the unique code is dynamically generated based on a triggering event, wherein the triggering event is any of starting the vehicle, opening or closing of a vehicle door, detection of an input of a user interface, detection of a wireless communication of a portable electronic device.

One advantage with this embodiment is that the triggering event can be used for controlling the generation of the unique code in order to have a unique code to be read by the portable electronic device e.g. when the user starts using or ends using the vehicle and/or the vehicle application.

According to a third aspect there is provided a processing circuitry program product comprising a non-transitory processing circuitry readable medium, having thereon a processing circuitry program comprising program instructions, the processing circuitry program being loadable into a processing circuitry and configured to cause execution of the method when the processing circuitry program is run by the at least one processing circuitry.

The present disclosure will become apparent from the detailed description given below. The detailed description and specific examples disclose preferred embodiments of the disclosure by way of illustration only. Those skilled in the art understand from guidance in the detailed description that changes and modifications may be made within the scope of the disclosure.

Hence, it is to be understood that the herein disclosed disclosure is not limited to the particular component parts of the device described or steps of the methods described since such device and method may vary. It is also to be understood that the terminology used herein is for purpose of describing particular embodiments only, and is not intended to be limiting. It should be noted that, as used in the specification and the appended claim, the articles "a", "an", "the", and "said" are intended to mean that there are one or more of the elements unless the context explicitly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTION OF THE DRAWINGS

The above objects, as well as additional objects, features and advantages of the present disclosure, will be more fully appreciated by reference to the following illustrative and non-limiting detailed description of example embodiments of the present disclosure, when taken in conjunction with the accompanying drawings.

DETAILED DESCRIPTION

The present disclosure will now be described with reference to the accompanying drawings, in which preferred example embodiments of the disclosure are shown. The disclosure may, however, be embodied in other forms and should not be construed as limited to the herein disclosed embodiments. The disclosed embodiments are provided to fully convey the scope of the disclosure to the skilled person.

Figure 1:
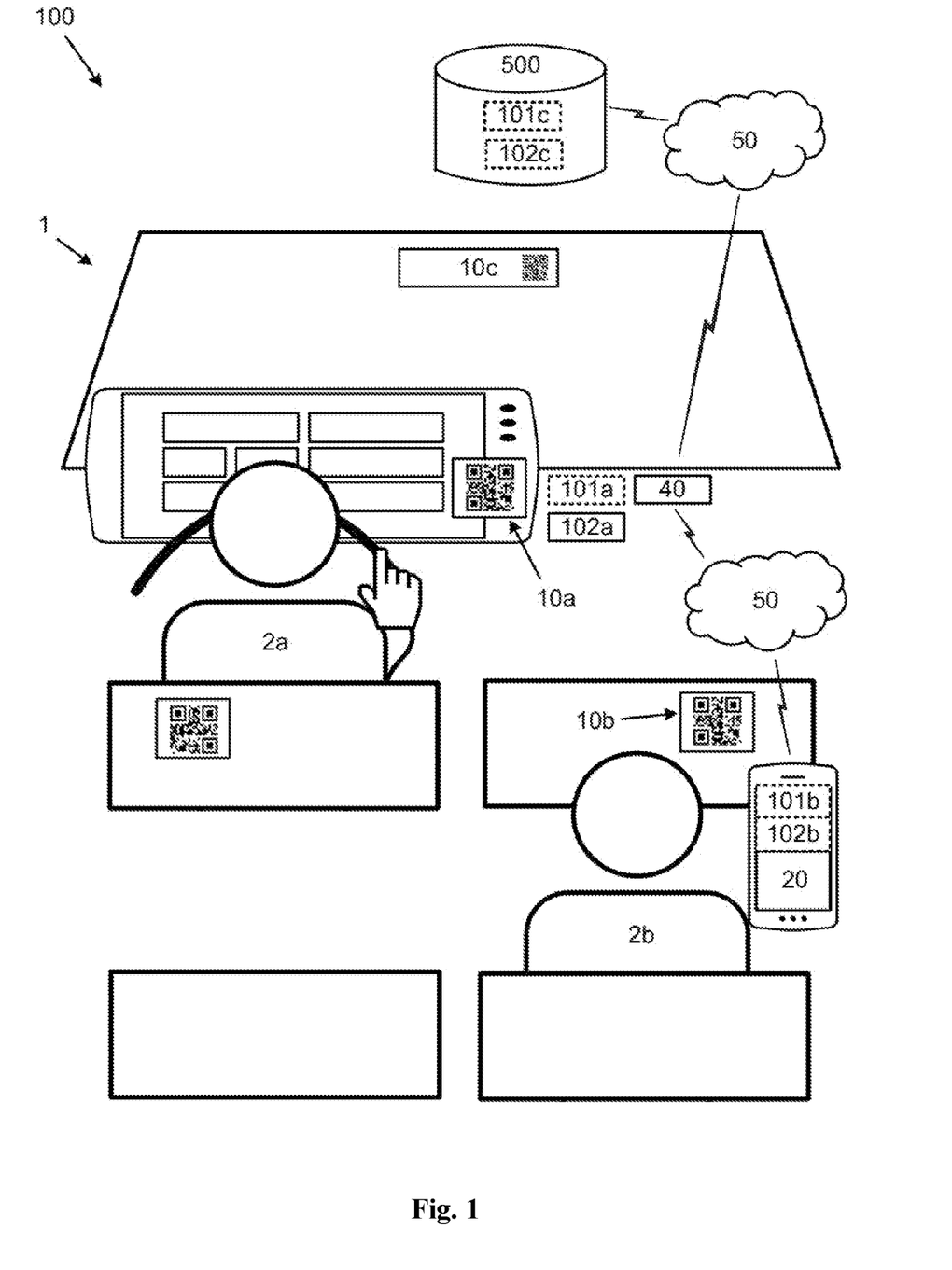
FIG. 1 illustrates an example system according to some embodiments of the present disclosure.

FIG. 1 illustrates an example system according to some embodiments of the present disclosure. The first aspect of this disclosure shows a system 100 for generating a linkage between a vehicle 1 and a user 2a, 2b and for generating a linkage between users 2a, 2b linked to the vehicle 1. According to some embodiments the system is a vehicle security system. According to some embodiments there is provided a system 100 for generating a linkage between a vehicle 1 and multiple users 2a, 2b and for generating a linkage between the multiple users 2a, 2b linked to the vehicle 1. According to some embodiments the linkage between the vehicle 1 and a user 2a, 2b is based on the presence of the user 2a, 2b inside of the vehicle 1. According to some embodiments the vehicle 1 is any of a car pool vehicle, a rental vehicle, or a taxi.

The system 100 comprises a display device 10a, 10b, 10c arranged at the vehicle 1 configured to display image data of a code. FIG. 1 illustrates example display devices 10a, 10b, 10c. According to some embodiments the display device is a dashboard display device 10a arranged at the driver seat in the vehicle 1 to be visible for a user that is seated in the driver seat. According to some embodiments the display device is a passenger display device 10b arranged at a passenger seat in the vehicle 1 to be visible for a user seated in the passenger seat. According to some embodiments the display device is arranged at the vehicle 1 to be visible for any user in the vehicle 1. In an example the display device is a mirror display unit 10c.

According to some embodiments the code displayed at the display device 10a, 10b, 10c is a machine readable code associated with the vehicle 1. According to some embodiments the code is a number and/or a combination of figures and letters. According to some embodiments the code is a serial number. According to some embodiments the code is at least any of, or a combination of at least any of, a two dimensional code, a three dimensional code, an image a Quick Response code, a High Capacity Colored Two Dimensional Code, a European Article Number code, a Data Matrix code or a Maxi Code. This means that the code displayed at a display device 10a, 10b, 10c is visually readable by a machine but also visually detectable by a user 2a, 2b in the vehicle 1.

According to some embodiments the code is an industry standard machine readable code. According to some embodiments the code is a company internal machine readable code. According to some embodiments the code is an open source machine readable code.

Figure 2A:
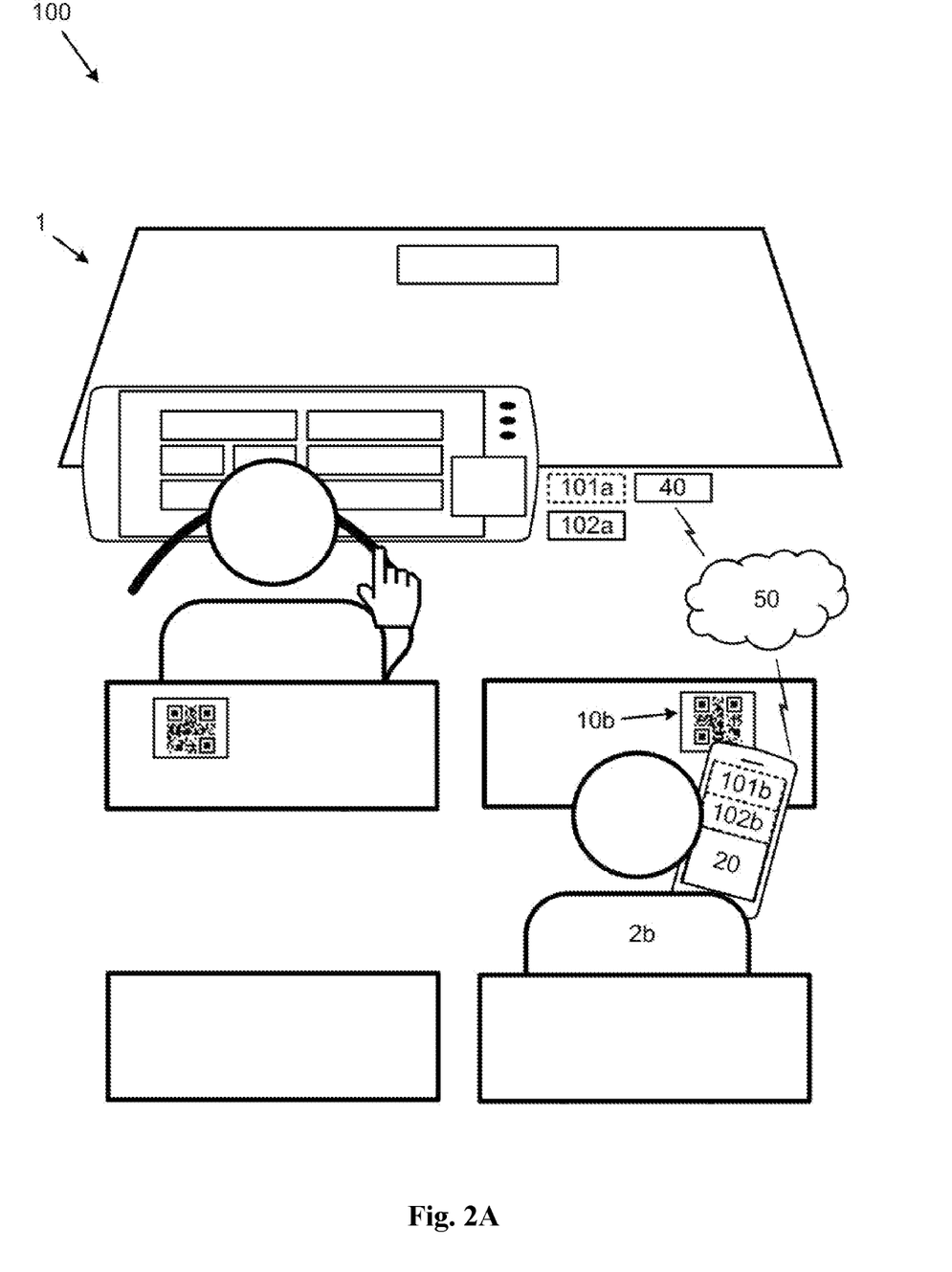
FIGS. 2A-2B illustrate an example system according to some embodiments of the present disclosure.
Figure 2B:
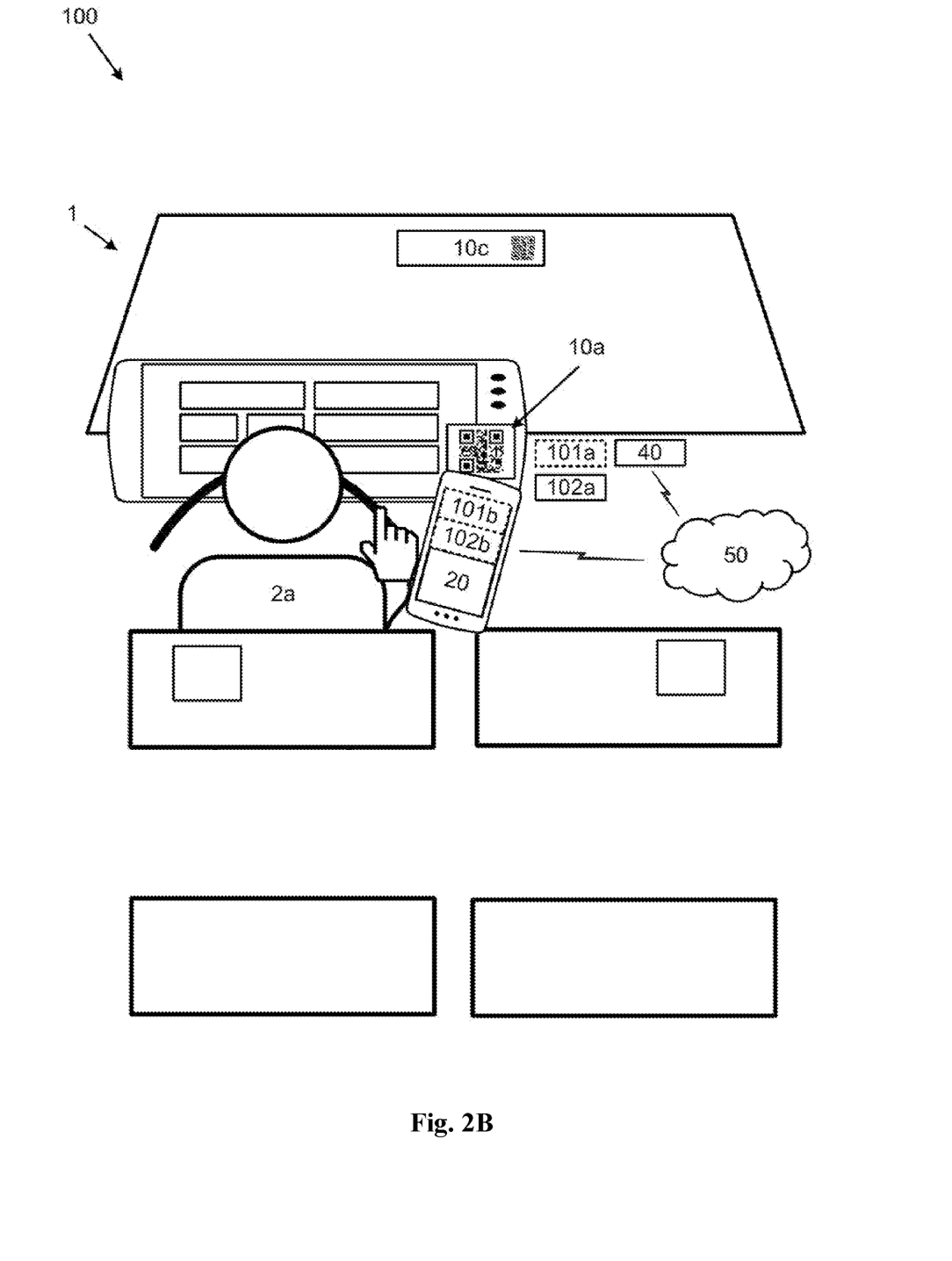

The system 100 comprises a communication device 40 configured to communicate with a portable electronic device 20. According to some embodiments the communication device 40 is configured to communicate with the portable electronic device 20 via a communication network 50. According to some embodiments the communication network 50, as illustrated in FIGS. 1, 2A and 2B, is a standardized wireless local area network such as a Wireless Local Area Network, WLAN, Bluetooth™, ZigBee, Ultra-Wideband, Near Field Communication, NFC, Radio Frequency Identification, RFID, or similar network. According to some embodiments the communication network 50 is a standardized wireless wide area network such as a Global System for Mobile Communications, GSM, Extended GSM, General Packet Radio Service, GPRS, Enhanced Data Rates for GSM Evolution, EDGE, Wideband Code Division Multiple Access, WCDMA, Long Term Evolution, LTE, Narrowband-IoT, 5G, Worldwide Interoperability for Microwave Access, WiMAX or Ultra Mobile Broadband, UMB or similar network. According to some embodiments the communication network 50 is combination of a local area network and a wide area network. According to some embodiments the communication network 50 is a wired network. According to an aspect the communication network 50 is defined by common Internet Protocols.

The system 100 comprises a processing circuitry 102a, 102b, 102c configured to be operatively connected to the display device 10a, 10b, 10c and the communication device 40. According to some embodiments the processing circuitry 102a is the processing circuitry of an on-board vehicle computer.

According to some embodiments the processing circuitry 102b is comprised in a portable electronic device 20 connectable to the system 100 via a communication network 50, as illustrated in FIG. 1.

According to some embodiments the processing circuitry 102c is comprised in a server 500 connectable to the system 100 via a communication network 50, as illustrated in FIG. 1.

According to some embodiments system 100 further comprises a memory 101a, 101b, 101c configured to store data. According to some embodiments the memory 101a is the memory of an on-board vehicle computer.

According to some embodiments the memory 101b is comprised in a portable electronic device 20 connectable to the system 100 via a communication network 50, as illustrated in FIG. 1.

According to some embodiments the memory 101c is comprised in a server 500 connectable to the system 100 via a communication network 50, as illustrated in FIG. 1.

The processing circuitry 102a, 102b, 102c is configured to generate a unique code to be displayed at the display device 10a, 10b, 10c, and display the unique code at the display device 10a, 10b, 10c to be read by a portable electronic device 20 associated with a user 2a, 2b.

According to some embodiments the portable electronic device 20 is associated with the user 2a, 2b via any of a personal identification code, a user account, biometric identification data, face recognition data, fingerprint data, a user bank account data or a user payment method data. In an example, a portable electronic device 20 e.g. a smartphone or a tablet, that is unlocked by any of a fingerprint data or a face recognition data is considered to be in the hands of the user 2a, 2b.

In an example as illustrated in FIG. 2A, the user is a passenger in the vehicle 1, seated at a certain passenger seat in the vehicle 1. In an example as illustrated in FIG. 2B, the user is a driver of the vehicle 1, seated at the driver seat in the vehicle 1.

The processing circuitry 102a, 102b, 102c is further configured to receive, via the communications device 40, a determination that the unique code has been read by the portable electronic device 20 associated with the user 2a, 2b, and establish a trusted linkage between the vehicle 1 and the user 2a, 2b based on the presence of the portable electronic device 20 at the vehicle 1.

According to some embodiments, in a determination that the unique code has not been read by the portable electronic device 20 within a predetermined time, the processing circuitry 102a, 102b, 102c is further configured to generate a new unique code to be displayed at the display device 10a, 10b, 10c.

One advantage with this first aspect is that the unique code displayed at the display device 10a, 10b, 10c can only be read by a portable electronic device 20 that is present in front of the display device 10a, 10b, 10c when the unique code is generated and displayed, i.e. at the vehicle 1, and the trusted linkage can be generated accordingly. Since the code is unique the portable electronic device 20 has to be in front of the display device 10a, 10b, 10c when reading the unique code, and with an already existing association between the user 2a, 2b and the portable electronic device 20, the trusted linkage is established based on the presence of the user 2a, 2b at the vehicle.

According to some embodiments the processing circuitry 102a, 102b, 102c is further configured to generate linkage data indicative of a linkage between the vehicle 1 and the user 2a, 2b associated with the portable electronic device 20. According to some embodiments the linkage data is stored in the memory 101a, 101b, 101c. One advantage with this embodiment is that an existing secure association between the user 2a, 2b and the portable electronic device 20 can be used to further associate the user 2a, 2b with the vehicle.

According to some embodiments the processing circuitry 102a, 102b, 102c is further configured to obtain predetermined social data associated with the user 2a, 2b.

One advantage with this embodiment is that the predetermined social data can be used for matching one user with another user that has similar interest based on predetermined social data obtained for each user.

According to some embodiments, the processing circuitry 102a, 102b, 102c is further configured to receive, via the communications device 40, a determination that a first unique code has been read by a first portable electronic device associated with a first user 2a, and receive, via the communications device 40, a determination that a second unique code has been read by a second portable electronic device associated with a second user 2, and establish a trusted linkage between the vehicle 1, the first user 2a and the second user 2b based on the presence of the first portable electronic device and the second portable electronic device at the vehicle 1.

One advantage with this embodiment is that the trusted linkage between the vehicle 1, first user 2a and the second user 2b can be used for generating a social linkage between the first user 2a and the second user 2b in that the first user 2a and the second user 2b are both associated with the vehicle 1. In an example the first user 2a and the second user 2b both commute with the vehicle 1. In an example the first user 2a and the second user 2b are two users out of multiple users that commute with the vehicle 1.

According to some embodiments the first unique code equals the second unique code. In an example the first portable electronic device and the second portable electronic device reads the unique code at the same time. In an example the first unique code is read by the first portable electronic device at a first time and the second unique code is read by the second portable electronic device at a second time.

One advantage with this embodiment is that a linkage between the first user 2a and the second user 2b can be generated indicative of that the first user 2a and the second user 2b are travelling with the vehicle 1.

According to some embodiments the trusted linkage between the vehicle 1, the first user 2a and the second user 2b is used for establishing a social association linkage data between the first user 2a and the second user 2b. In an example the social association linkage data can be used for matching the first user 2a with the second user 2b in order to get the first user 2a in connection with the second user 2b.

According to some embodiments, the processing circuitry 102a, 102b, 102c is further configured to obtain, based on the trusted linkage between the vehicle 1, the first user 2a and the second user 2b, predetermined social data of the first user 2a and predetermined social data of the second user 2b, and determine correlation data between the obtained predetermined social data of the first user 2a and the obtained predetermined social data of the second user 2b, and generate social association linkage data between the first user 2a and the second user 2b in a determination that the correlation data is above a predefined threshold level.

One advantage with this embodiment is that a level of e.g. the number of mutual interests can be used for generating social association linkage data between the first user 2a and the second user 2b.

According to some embodiments the social association linkage data is used for matching the first user 2a with the second user 2b. According to some embodiments the matching is based on predetermined interest data. In an example the predetermined social data comprising personal data such as age, gender, interests, language, location, social status, etc. In an example the predetermined social data comprising specified parameters set by the user.

According to some embodiments the social association linkage data is based on the linkage between the first portable electronic device associated with the first user 2a and the second portable electronic device associated with the second user 2b.

According to some embodiments, the trusted linkage between the vehicle 1, the first user 2a and the second user 2b is generated when the first user 2a and the second user 2b are travelling with the vehicle 1 at the same time.

One advantage with this embodiment is that the first user 2a and/or the second user 2b can be notified that both the first user 2a and the second user 2b are present on the vehicle 1.

According to some embodiments, the trusted linkage between the vehicle 1, the first user 2a and the second user 2b is generated when the he first user 2a and the second user 2b have both been travelling with the vehicle 1 independent of time.

One advantage with this embodiment is that the first user 2a and/or the second user 2b can be notified that both the first user 2a and the second user 2b travels with the vehicle 1 at the same time or at different times.

According to some embodiments the processing circuitry 102a, 102b, 102c is further configured to allow control of a vehicle application associated with the vehicle 1, by the portable electronic device 20, based on the trusted linkage, and receive control data, indicative of instructions for controlling the vehicle application, from the portable electronic device 20 via a wireless communication network 50, and control the vehicle application.

According to some embodiments control of the vehicle application associated with the vehicle 1 comprising applying personal settings to the vehicle application.

In the example illustration of FIG. 2A, the user 2b is seated in right side backseat. In the example the display device 10b is arranged to be read by a portable electronic device 20 of the user 2b, when the user is seated at the right side backseat.

According to some embodiments the vehicle application is at least any of a vehicle comfort setting e.g. seat setting, a vehicle temperature setting, a vehicle infotainment feature setting, e.g. music or video control. According to some embodiments the display device 10a, 10b, 10c is arranged at a vehicle part that is associated with the vehicle application. In the example as illustrated in FIG. 2B, the user 2b is allowed to control, via the portable electronic device 20, the air conditioner to set a certain temperature at the right side backseat where the user 2b is seated. In an example the control of the vehicle application associated with the vehicle 1 comprising applying personal settings to the vehicle application such as setting a desired vehicle compartment temperature, playing a desired predefined music playlist etc.

One advantage with this embodiment is that a user can be allowed to control a vehicle application via the portable electronic device in a trusted way.

According to some embodiments the processing circuitry 102a, 102b, 102c is further configured to generate a first unique code to be displayed at a first display device 10a and to generate a second unique code to be displayed at a second display device 10b wherein the first unique code comprising master permission information data for establishing a trusted linkage between the vehicle 1 and a first user with a master permission, and the second unique code comprising a slave permission information data for establishing a trusted linkage between the vehicle 1 and a second user with a slave permission. In an example, the trusted linkage between the first user, e.g. the driver of the vehicle 1, is a master permission linkage used for allowing control a vehicle application via the portable electronic device 20 in a trusted way, wherein the control by the first user, the driver, overrides the control by a the second user, e.g. a passenger, with slave permission linkage.

According to some embodiments the processing circuitry 102a, 102b, 102c is further configured to time stamp the unique code and store time stamp data associated with the generated unique code, and store linkage data comprising the time stamp data associated with the generated unique code and user data of the user associated with the portable electronic device 20.

One advantage with this embodiment is that linkage data can be used for determining when in time a generated unique code is read by the portable electronic device and e.g. determine usage by the user of the vehicle and/or the vehicle application associated with a time.

According to some embodiments, the processing circuitry 102a, 102b, 102c is further configured to notify at least any of the first user 2a and the second user 2b, via a user interface of at least any of the first portable electronic device and the second portable electronic device the, a notification message indicative of the social association linkage data between the first user 2a and the second user 2b.

One advantage with this embodiment is that the first user 2a and the second user 2b will become aware of each other.

According to some embodiments, the notification message indicative of the social association linkage data between the first user 2a and the second user 2b is an indication that the first user 2a and the second user 2b are currently travelling with the vehicle 1 or an indication of a mutual time span when the first user 2a and the second user 2b usually are travelling with the vehicle 1.

One advantage with this embodiment is that the first user 2a and the second user 2b will know when there is a likelihood that the first user 2a and the second user 2b will meet at the vehicle 1.

According to some embodiments, the notification message indicative of the social association linkage data between the first user 2a and the second user 2b further indicates a recommended time when the first user 2a and the second user 2b are recommended to travel with the vehicle 1 in order to travel together with the vehicle 1. One advantage with this embodiment is that the first user 2a and the second user 2b both gets notified of a time to travel with the vehicle which increases the chances to meet at the vehicle 1.

According to some embodiments the established trusted linkage between the vehicle 1 and the user 2a, 2b is terminated at a certain time after establishing the trusted linkage. According to some embodiments the trusted linkage between the vehicle 1 and the user 2a, 2b is terminated a predefined time after establishing the trusted linkage between the vehicle 1 and the user 2a, 2b. According to some embodiments the trusted linkage between the vehicle 1 and the user 2a, 2b is terminated in a determination that a further unique code has been read by the portable electronic device 20 associated with the user 2a, 2b.

According to some embodiments time stamp data associated with each generated unique code is used for generating usage data.

According to some embodiments the unique code is dynamically generated based on a triggering event, wherein the triggering event is any of starting the vehicle, opening or closing of a vehicle door, detection of an input of a user interface or detection of a wireless communication of a portable electronic device 20. According to some embodiments the triggering event is any of unlocking the vehicle, determining a presence of a vehicle key in the vicinity of the vehicle, stopping the vehicle, locking the vehicle or parking the vehicle.

According to some embodiments detection of a wireless communication of a portable electronic device 20 comprising detection of sort range wireless communication via a Near Field Communication interface of the portable electronic device 20. According to some embodiments a Near Field Communication interface device is arranged at the display device 10a, 10b, 10c operatively connected to the communication device 40. In an example the generation of the unique code is initiated in a determination that the portable electronic device 20 is in the vicinity of a Near Field Communication interface device arranged at the display device 10a, 10b, 10c operatively connected to the communication device 40. In an example, with reference to FIG. 2A, a user 2b can dip the portable electronic device 20 onto the display device 10b in order to generate a unique code to be read by the portable electronic device 20.

One advantage with this embodiment is that the triggering event can be used for controlling the generation of the unique code in order to have a unique code to be read by the portable electronic device e.g. when the user starts using or ends using the vehicle and/or the vehicle application.

According to some embodiments the unique code is dynamically generated continuously at a predefined time interval until a determination of that the unique code has been read by a portable electronic device 20 associated with a user 2a, 2b. According to some embodiments the unique code is changing continuously code until a determination of that the unique code has been read by a portable electronic device 20 associated with a user 2a, 2b.

One advantage with this embodiment is that the portable electronic device always reads a unique code that is never older than a predefined time interval which can be set dependent on a desired security level.

According to some embodiments the processing circuitry 102a, 102b, 102c is further configured to determine usage data based on the linkage data indicative of the use of the vehicle 1 by the user 2a, 2b, and generate payment details based on the usage data.

One advantage with this embodiment is that time information, and e.g. usage of vehicle application etc., can be determined and form base for payment details to be used for charging the user of certain usage of the vehicle.

According to some embodiments the vehicle 1 is a taxi vehicle. Reference is made to FIG. 2A. According to some embodiments the display device 10b is arranged at the taxi vehicle configured to display image data of a code to be read by a user 2b that is a taxi passenger for initiating the taxi ride. In an example an established trusted linkage between the taxi vehicle and the taxi passenger 2b based on the presence of the portable electronic device 20 at the taxi vehicle is used for verifying the taxi passenger 2b. According to some embodiments the display device 10b is further configured to display image data of a code to be read by the taxi passenger for ending the taxi ride.

According to some embodiments the vehicle 1 is a rental vehicle. Reference is made to FIG. 2B. According to some embodiments the display device 10a, 10c is arranged at the rental vehicle configured to display image data of a code to be read by a user 2a that is a rental vehicle driver for initiating the rental period of the rental vehicle. In an example an established trusted linkage between the rental vehicle and rental vehicle driver 2a based on the presence of the portable electronic device 20 at the rental vehicle is used for verifying the rental vehicle driver 2a. According to some embodiments the display device 10a, 10c is configured to display image data of a code to be read by the rental vehicle driver for ending rental period of the rental vehicle.

According to some embodiments the unique code is configured to be read by a portable electronic device 20 comprising a reader device that is any of a camera reader, a video camera reader, a pen-type reader with photodiodes, a laser scanner reader, a charge-coupled device reader. One advantage with this embodiment is that the unique code can be read by a plural of different reader devices.

According to some embodiments the display device 10a, 10b, 10c arranged at the vehicle 1 is further configured to display user associated information based on the trusted linkage between the vehicle 1 and the user 2a, 2b. According to some embodiments the user associated information is related to information obtained from the portable electronic device 20 associated with the user 2a, 2b. In an example the display device 10a, 10b, 10c is configured to display at least any of multimedia data, message data and a contact detail data.

In an example the display device 10a, 10b, 10c is configured to display unique commercial data based on the trusted linkage between the vehicle 1 and the user.

According to some embodiments plural trusted linkages between the vehicle 1 and plural different users are established. In an example the display device 10a, 10b, 10c is configured to display personal data based on the trusted linkage between the vehicle 1 and the user. In an example the display device 10a, 10b, 10c is configured to display personal data of another person in the vehicle based on the trusted linkage between the vehicle 1 and the user. According to some embodiments, in a determination of the presence of a first portable electronic device at the vehicle 1 associated with a first user and in a determination of the presence of a second portable electronic device at the vehicle 1 associated with a second user, displaying personal data of the first user to the second user based on the trusted linkage between the vehicle 1 and first and the second user. In an example, a first user and a second user are sharing the same vehicle 1 and are informed about each other, e.g. about information of mutual interest, e.g. both users are fans of the same soccer team, are both singles, or both enjoy running etc.

Figure 3:
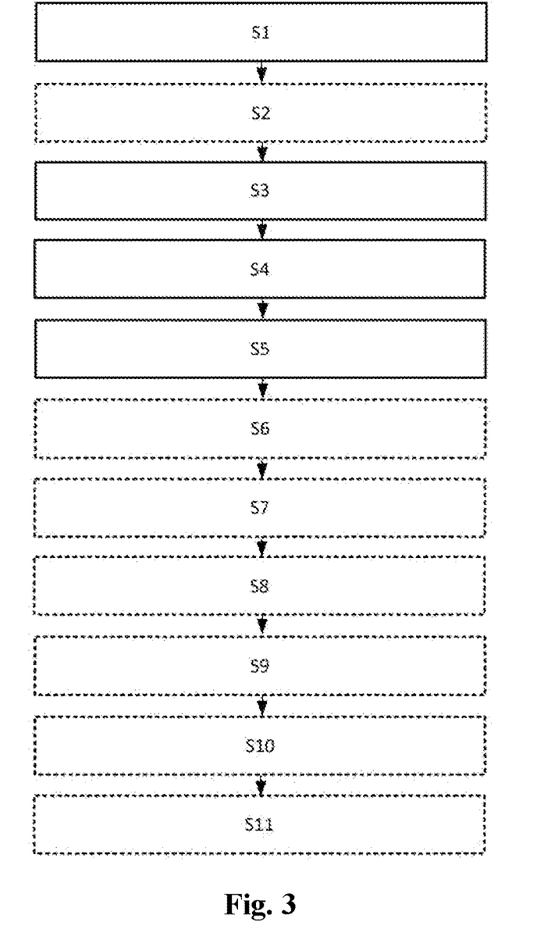
FIG. 3 illustrate a flow chart of the method steps according to the second aspect of the disclosure.

According to a second aspect there is provided a method for generating a linkage between a vehicle 1 and a user 2a, 2b and for generating a linkage between users 2a, 2b linked to the vehicle 1. According to some embodiments there is provided a method for generating a linkage between a vehicle 1 and multiple users 2a, 2b and for generating a linkage between the multiple users 2a, 2b linked to the vehicle 1. FIG. 3 illustrates a flow chart of the method steps according to the second aspect of the disclosure. The method the vehicle comprises the step of Si generating a unique code to be displayed at a display device 10a, 10b, 10c arranged at the vehicle 1. The method further comprises the step of S3 displaying the unique code at the display device 10a, 10b, 10c to be read by a portable electronic device 20 associated with a user 2a, 2b, and the step of S4 receiving, via a communications device 40, a determination that the unique code has been read by the portable electronic device 20 associated with the user 2a, 2b, and the step of S5 establishing a trusted linkage between the vehicle 1 and the user 2a, 2b based on the presence of the portable electronic device 20 at the vehicle 1.

One advantage with this second aspect is that the unique code displayed at the display device can only be read by a portable electronic device that is present in front of the display device when the unique code is generated and displayed, i.e. at the vehicle, and the trusted linkage can be generated accordingly.

According to some embodiments the method further comprising the step of S6 generating linkage data indicative of a linkage between the vehicle 1 and the user 2a, 2b associated with the portable electronic device 20.

One advantage with this embodiment is that an existing secure association between the user and the portable electronic device can be used to further associate the user with the vehicle.

According to some embodiments the method further comprising the step of obtaining predetermined social data associated with the user 2a, 2b.

According to some embodiments the method further comprising the step of receiving, via the communications device 40, a determination that a first unique code has been read by a first portable electronic device associated with a first user 2a, and the step of receiving, via the communications device 40, a determination that a second unique code has been read by a second portable electronic device associated with a second user 2, and the step of establishing a trusted linkage between the vehicle 1, the first user 2a and the second user 2b based on the presence of the first portable electronic device and the second portable electronic device at the vehicle 1.

According to some embodiments the method further comprising the step of obtaining, based on the trusted linkage between the vehicle 1, the first user 2a and the second user 2b, predetermined social data of the first user 2a and predetermined social data of the second user 2b, and the step of determining correlation data between the obtained predetermined social data of the first user 2a and the obtained predetermined social data of the second user 2b, and the step of generating social association linkage data between the first user 2a and the second user 2b in a determination that the correlation data is above a predefined threshold level.

According to some embodiments the method further comprising notifying at least any of the first user 2a and the second user 2b, via a user interface of at least any of the first portable electronic device and the second portable electronic device the, a notification message indicative of the social association linkage data between the first user 2a and the second user 2b.

According to some embodiments the notification message indicative of the social association linkage data between the first user 2a and the second user 2b is an indication that the first user 2a and the second user 2b are currently travelling with the vehicle 1 or an indication of a mutual time span when the first user 2a and the second user 2b usually are travelling with the vehicle 1.

According to some embodiments the notification message indicative of the social association linkage data between the first user 2a and the second user 2b further indicates a recommended time when the first user 2a and the second user 2b are recommended to travel with the vehicle 1 in order to travel together with the vehicle 1.

In an example, the first user 2a and the second user 2b are two users of a social group on a commuting route that usually travel together. In an example, the first user 2a and the second user 2b are two of multiple users of the social group.

According to some embodiments the method further comprising the step of S8 allowing control of a vehicle application associated with the vehicle 1, by the portable electronic device 20, based on the trusted linkage, and the step of S9 receiving control data, indicative of instructions for controlling the vehicle application, from the portable electronic device 20 via a wireless communication network 50, and control the vehicle application.

One advantage with this embodiment is that a user can be allowed to control a vehicle application via the portable electronic device in a trusted way.

According to some embodiments the method further comprising the step of S2 time stamping the unique code and storing time stamp data associated with the generated unique code, and the step of S7 storing linkage data comprising the time stamp data associated with the generated unique code and user data of the user associated with the portable electronic device 20.

One advantage with this embodiment is that linkage data can be used for determining when in time a generated unique code is read by the portable electronic device and e.g. determine usage by the user of the vehicle and/or the vehicle application associated with a time.

According to some embodiments the method further comprising the step of S10 determining usage data, based on the linkage data, indicative of the use of the vehicle 1 by the user 2a, 2b, and S11 generating payment details based on the usage data.

One advantage with this embodiment is that time information, and e.g. usage of vehicle application etc. can be determined and form base for payment details to be used for charging the user of certain usage of the vehicle.

According to some embodiments the unique code is dynamically generated based on a triggering event, wherein the triggering event is any of starting the vehicle, opening or closing of a vehicle door, detection of an input of a user interface, detection of a wireless communication of a portable electronic device 20.

One advantage with this embodiment is that the triggering event can be used for controlling the generation of the unique code in order to have a unique code to be read by the portable electronic device e.g. when the user starts using or ends using the vehicle and/or the vehicle application.

Figure 4:
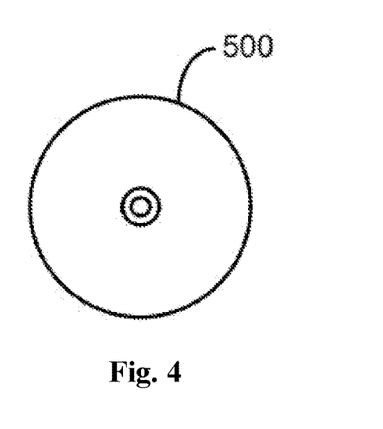
FIG. 4 illustrate a computer program product according to the third aspect of the disclosure.

According to a third aspect there is provided a processing circuitry program product 500 comprising a non-transitory processing circuitry readable medium, having thereon a processing circuitry program comprising program instructions, the processing circuitry program being loadable into a processing circuitry 102a, 102b, 102c and configured to cause execution of the method when the processing circuitry program is run by the at least one processing circuitry 102a, 102b, 102c.

The person skilled in the art realizes that the present disclosure is not limited to the preferred embodiments described above. The person skilled in the art further realizes that modifications and variations are possible within the scope of the appended claims. Additionally, variations to the disclosed embodiments can be understood and effected by the skilled person in practicing the claims, from a study of the drawings, the disclosure, and the appended claims.

What is claimed is:

1. A system for generating a linkage among a vehicle, a first portable electronic device associated with a first user, and a second portable electronic device associated with a second user, the system comprises:
    a display device arranged at the vehicle configured to display image data of a code;
    a communication device configured to communicate with the first and second portable electronic devices;
    a processing circuitry configured to be operatively connected to the display device and the communication device, and configured to:
    generate a first unique code to be displayed at the display device,
    display the first unique code at the display device to be read by the first portable electronic device associated with the first user,
    receive, via the communications device, a determination that the first unique code has been read by the first portable electronic device associated with the first user,
    generate a second unique code to be displayed at the display device,
    display the second unique code at the display device to be read by the second portable electronic device associated with the second user,
    receive, via the communications device, a determination that the second unique code has been read by the second portable electronic device associated with the second user;
    establish a trusted linkage between the vehicle and each of the first and second portable electronic devices based on the presence of the first portable electronic device and the second portable electronic device at the display device arranged at the vehicle as indicated by receipt of the determinations that the first and second unique codes have been read; and
    establish a social association between the first user of the first portable electronic device and the second user of the second portable electronic device by obtaining predetermined social data from the first and second portable electronic devices based on the trusted linkages, identifying a correlation in the predetermined social data, and notifying the first and second portable electronic devices of the social association.

2. The system according to claim 1, wherein the processing circuitry is further configured to:
    generate linkage data indicative of a linkage between the vehicle and the first user associated with the first portable electronic device.

3. The system according to claim 1, wherein the notification to the first and second portable electronic devices of the social association between the first user and the second user is an indication that the first user and the second user are currently travelling with the vehicle or an indication of a mutual time span when the first user and the second user usually are travelling with the vehicle.

4. The system according to claim 1, wherein the notification to the first and second portable electronic devices of the social association linkage data between the first user and the second user indicates a recommended time when the first user and the second user are recommended to travel with the vehicle in order to travel together with the vehicle.

5. A method for generating a linkage among a vehicle, a first portable electronic device associated with a first user, and a second portable electronic device associated with a second user, the method comprising:
    generating a first unique code to be displayed at a display device arranged at the vehicle,
    displaying the first unique code at the display device to be read by the first portable electronic device associated with the first user,
    receiving, via a communications device, a determination that the first unique code has been read by the first portable electronic device associated with the first user,
    generating a second unique code to be displayed at a display device arranged at the vehicle,
    displaying the second unique code at the display device to be read by the second portable electronic device associated with the second user,
    receiving, via the communications device, a determination that the second unique code has been read by the second portable electronic device associated with the second user;
    establishing a trusted linkage between the vehicle and each of the first and second portable electronic devices based on the presence of the first portable electronic device and the second portable electronic device at display device arranged at the vehicle as indicated by receipt of the determinations that the first and second unique codes have been read; and
    establishing a social association between the first user of the first portable electronic device and the second user of the second portable electronic device by obtaining predetermined social data from the first and second portable electronic devices based on the trusted linkages, identifying a correlation in the predetermined social data, and notifying the first and second portable electronic devices of the social association.

6. The method according to claim 5, further comprising:
    generating linkage data indicative of a linkage between the vehicle and the first user associated with the first portable electronic device.

7. The method according to claim 5, wherein the notification to the first and second portable electronic devices of the social association between the first user and the second user is an indication that the first user and the second user are currently travelling with the vehicle or an indication of a mutual time span when the first user and the second user usually are travelling with the vehicle.

8. The method according to claim 5, wherein the notification to the first and second portable electronic devices of the social association between the first user and the second user further indicates a recommended time when the first user and the second user are recommended to travel with the vehicle in order to travel together with the vehicle.

9. A non-transitory processing circuitry readable medium having stored thereon a processing circuitry program comprising program instructions, the processing circuitry program being loadable into a processing circuitry and configured to cause execution of the method according to claim 8 when the processing circuitry program is run by the processing circuitry.

* * * * *